(12) United States Patent
Marzorati et al.

(10) Patent No.: US 10,348,512 B2
(45) Date of Patent: Jul. 9, 2019

(54) AMORPHOUS AD-HOC GROUPS BASED ON SWARMING BEHAVIOR

(71) Applicant: INTERNATIONAL BUSINESS MACHINES CORPORATION, Armonk, NY (US)

(72) Inventors: Mauro Marzorati, Lutz, FL (US); Aaron K. Baughman, Silver Spring, MD (US); Patrick Rodrigo Mardones Rodriguez, Recoleta (CL); Gary Diamanti, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 15/818,075

(22) Filed: Nov. 20, 2017

(65) Prior Publication Data

US 2019/0158301 A1    May 23, 2019

(51) Int. Cl.
*H04L 12/18* (2006.01)
*H04L 12/58* (2006.01)
*H04W 4/20* (2018.01)

(52) U.S. Cl.
CPC ........ *H04L 12/185* (2013.01); *H04L 12/1822* (2013.01); *H04L 12/1845* (2013.01); *H04L 51/20* (2013.01); *H04W 4/20* (2013.01)

(58) Field of Classification Search
CPC .............. H04L 12/185; H04L 12/1845; H04L 12/1822; H04L 51/20; H04W 4/02;
(Continued)

(56) References Cited

U.S. PATENT DOCUMENTS 8,612,483 B2  12/2013  Fischer et al.
9,118,731 B2   8/2015  Bennett et al.
(Continued)

OTHER PUBLICATIONS

Chen, Shuhong et al.; Cluster-group based trusted computing for mobile social networks using implicit social behavioral graph; Future Generation Computer Systems; vol. 55, Feb. 2016; pp. 391-400.

(Continued)

*Primary Examiner* — Le H Luu
(74) *Attorney, Agent, or Firm* — Schmeiser, Olsen & Watts; Mark C. Vallone

(57) ABSTRACT

A computer-implemented process for groups includes forming a group using a series of invitation, acceptance and confirmation handshake messages. A location center for the group is calculated as an average location for all members of the group as calculated by the computer from data included in at least one message of the messages. The computer calculates a perimeter for the group from the data. The computer calculates a time decay parameter for the group from the data. The computer calculates a group profile for the group based on at least the location center, the perimeter and the time decay parameter. The computer adds a new member to the group, by any member triggering an invitation process with the new member. The computer recalculates the group profile on acceptance by the new member and transmits the recalculated group profile to all members including a confirmation message to the new member.

20 Claims, 8 Drawing Sheets

(58) Field of Classification Search
CPC ..... H04W 4/021; H04W 4/026; H04W 4/029; H04W 4/21; H04W 4/90; G06Q 50/265; G08B 27/00
See application file for complete search history.

(56) References Cited

U.S. PATENT DOCUMENTS

| | | | |
|---|---|---|---|
| 9,246,708 B2 | 1/2016 | Rao | |
| 10,178,507 B1* | 1/2019 | Roberts | H04W 4/026 |
| 2013/0123981 A1 | 5/2013 | Lee et al. | |
| 2014/0222704 A1* | 8/2014 | Abhyanker | H04W 4/21 705/319 |
| 2015/0065081 A1* | 3/2015 | Estes | H04W 4/021 455/404.2 |
| 2015/0117631 A1* | 4/2015 | Tuchman | H04W 4/21 379/265.09 |
| 2015/0332325 A1* | 11/2015 | Sharma | H04W 4/029 705/14.57 |
| 2016/0027054 A1 | 1/2016 | Leppanen et al. | |
| 2016/0048274 A1 | 2/2016 | Rosenberg | |
| 2016/0330601 A1* | 11/2016 | Srivastava | G06Q 50/265 |
| 2016/0330773 A1 | 11/2016 | Aneja et al. | |
| 2017/0086050 A1* | 3/2017 | Kerning | H04W 4/026 |
| 2017/0099579 A1* | 4/2017 | Ryan | H04W 4/029 |
| 2017/0213445 A1* | 7/2017 | Kusens | G08B 27/00 |
| 2017/0318444 A1* | 11/2017 | Estes | H04W 4/90 |

OTHER PUBLICATIONS

Open GeoSMS Standard—Core; URL: http://www.opengeospatial.org/standards/opengeosms; retrieved from the Internet Aug. 6, 2017; 2 pages.

Mayrhofer, A. et al.; A Uniform Resource Identifier for Geographic Locations; Internet Engineering Task Force (IETF) Request for Comments: 5870; Jun. 2010; 23 pages.

Graham, Susan L. et al.; An Improved Context-Free Recognizer; ACM Transactions on Programming Languages and Systems; vol. 2, No. 3, Jul. 1980; pp. 415-462.

GeoSMS; URL: https://geosms.wordpress.com/; retrieved from the Internet Aug. 6, 2017; 4 pages.

Minelli, Roberto et al.; I Know What You Did Last Summer—An Investigation of How Developers Spend Their Time; 2015 IEEE 23rd International Conference on Program Comprehension; May 18-19, 2015; pp. 25-35.

Yokota, Sho et al.; Motion Design of Service Robot—Study on Human Impression; 2014 12 IEEE Internation Conference on Industrial Informatics; Jul. 27-30, 2014; pp. 770-774.

Rosenberg, Louis B.; Human Swarming, a real-time method for Parallel Distributed Intelligence; 2015 Swarm/Human Blended Intelligence Workshop; Sep. 28-29, 2015; 7 pages.

* cited by examiner

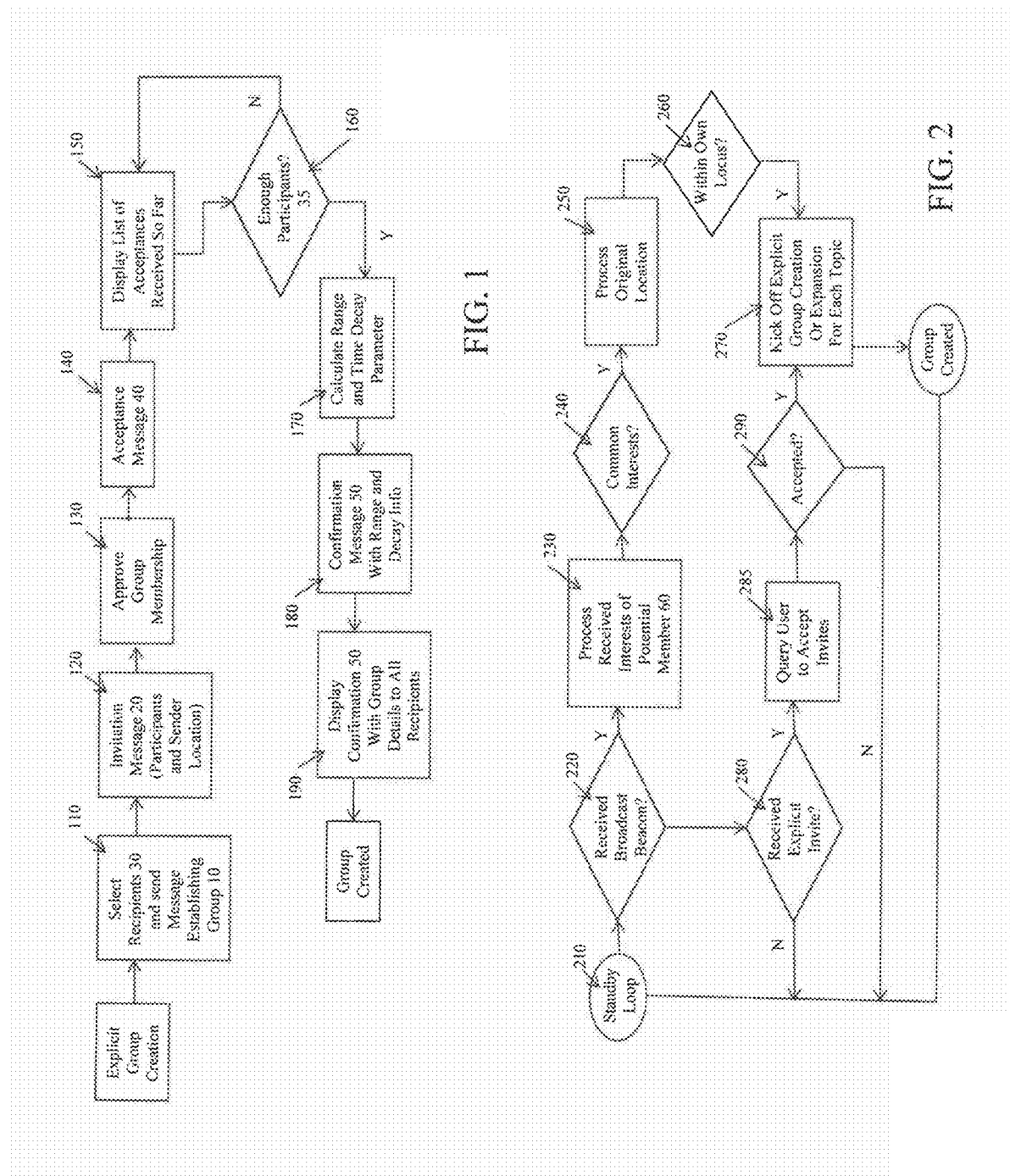

AMORPHOUS AD-HOC GROUPS BASED ON SWARMING BEHAVIOR

TECHNICAL FIELD

The present invention relates generally to systems and methods for collaborative intelligence, and more specifically to systems and methods for dynamic collaborative intelligence.

BACKGROUND

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, e-books, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence. Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group opinion in real-time. Furthermore, there is a need to provide tools and methods that enable groups of users to be informed of the group opinion that is emerging in real-time. The present invention, as described herein, addresses these and other deficiencies present in the art.

There exists the possibility to form groups such that messages are sent to every member of the group in current mobile telephony. Due to the distributed nature of the group membership, there's no way for a member of the group to remove themselves from the group. This leads to frustration on the part of the individuals who must process the messages sent to a group they no longer wishes to be a part of. What is missing is the ability to easily maintain group membership and relate relevant information among the group.

SUMMARY OF THE INVENTION

A computer-implemented process for amorphous cliques is provided using swarming behavior with the ability for replay time. The computer-implemented process comprises forming a group using a series of invitation, acceptance and confirmation handshake messages. A location center for the group is calculated whereby the location center is an average location for all members of the group as calculated by the computer from data embedded in at least one message of said messages. The computer calculates a perimeter for the group, where the perimeter defines a perimeter circumscribing all members of said group as calculated by the computer from data embedded in at least one message of said messages. The computer calculates a time decay parameter for the group, where the time decay parameter is a predetermined length of a message response time to maintain membership in the group as calculated by the computer from data embedded in at least one message of said messages. The computer calculates a group profile for the group, where the group profile comprises at least the location center, the perimeter and the time decay parameter. The computer adds a new member to the group, by any member triggering an invitation process with the new member. The computer recalculates the group profile on acceptance by the new member, where the recalculating is based on new data included in the acceptance, and the computer transmits the recalculated group profile to all members including a confirmation message to the new member.

BRIEF DESCRIPTION OF THE DRAWINGS

The above and other aspects, features and advantages of several embodiments of the present invention will be more apparent from the following more particular description thereof, presented in conjunction with the following drawings.

FIG. 1 illustrates a flow chart of steps to explicitly create a collaborative group in accordance with an embodiment of the present invention.

FIG. 2 illustrates a flow chart of steps to implicitly create a collaborative group in accordance with an embodiment of the present invention.

DETAILED DESCRIPTION

Figure 3A:
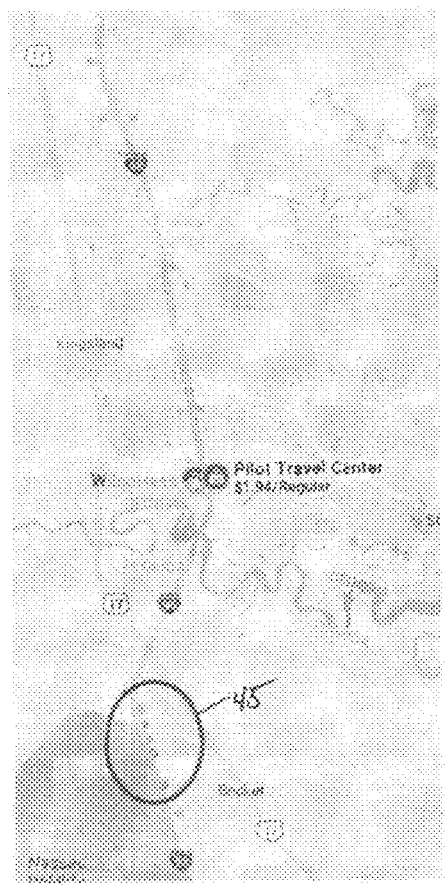
FIGS. 3a and 3b illustrate two different geographical representations of collaborative group and the group's spatial relation to one another in accordance with an embodiment of the present invention.

The following description is not to be taken in a limiting sense, but is made merely for the purpose of describing the general principles of exemplary embodiments. The scope of the invention should be determined with reference to the claims. Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media" refers to text, graphics, video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

The massive connectivity provided by the Internet is used to create a real-time closed-loop collaborative consciousness (or emergent group-wise intelligence) by collecting real-time input from large numbers of people through a novel user interface and processing the collected input from that large number of users into a singular group intent that can collectively answer questions, make statements, take actions, select functions, or otherwise respond to prompts in real time. The methods use intervening software and hardware to moderate the process, closing the loop around the disparate input from each of the many individual participants and the singular output of the group.

Disclosed is the capability for a group of agents (e.g., people and/or robots) that come together for an event at a time/place over a short period of time (e.g., weekend or a week) to establish ad-hoc groups or cliques in a given geographical area, such as a convention; or a moving locus, such as a weekend trip in a 10-car caravan. The use of swarming behavioral constructs supports social constructs such as intra-group communications. If robots are used in combination with humans, a situation can be replayed. In other words, users can virtually travel "back into time" to revisit a situation encountered by others in the past and learn.

SMS/MMS may be leveraged as the enabling medium to institute the method disclosed.

There exists the possibility to form groups such that messages are sent to every member of the group in current mobile telephony. If someone is to be added or removed to the group a new group needs to be established. As new groups are formed, situations can be replayed through time. As a result, humans can learn with robots how to act within certain situations as they travel back in time for a "do over". The method and system of this invention provides a new and useful improvement to the technology of communicating by forming groups based, at least in part, on the center and perimeter of the group as well as the response time of members within the group. The queries and responses of each group member is used to share information and to maintain, alter and/or dissolve the group.

Due to the distributed nature of the conventional group membership, there's no way for a member of the group to remove themselves from the group. This leads to frustration on the part of the individual who must process the messages sent to a group he no longer wishes to be a part of. The ability to easily maintain the group membership is lacking in the conventional approaches.

The present invention also provides for the incorporation of computer intelligence into the group. The Turing test is a test, developed by Alan Turing in 1950, of a machine's ability to exhibit intelligent behavior equivalent to, or indistinguishable from, that of a human. Turing proposed that a human evaluator would judge natural language conversations between a human and a machine that is designed to generate human-like responses. Computational machines can pass some Turing tests, including beating human in chess (www.chess.ibm.com) and answering NLP questions (www.ibmwatson.com). Humanoid robots are now moving around the physical space with humans. Consequently, these types of robots should be managed alongside humans when participating in cliques. Robots may join or leave the group or clique sooner or later dependent on the makeup of the group/clique.

The present invention discloses a few rules to instill swarming behavior into the establishment of group membership in SMS messages or other communication systems, with specially coded control messages inside the SMS block or its equivalent. This too provides a unique improvement in the technology of interpersonal communication. Additionally, the present invention discloses a mechanism for open and closed swarms to form based on preferences or topics of members within the group. While the present embodiment in one embodiment utilizes SMS/MMS technology, it is envisioned that other means of communication among members may be employed in light of the invention disclosed herein. In this context, members are individuals (2 or more to initiate it) who met the group creation criteria and formed and joined the group. Senders and receivers are participants in the group who are referred to by their action at that time. Individuals who join the group can send messages or content and receive messages or content from other swarm members.

In accordance with one embodiment, a group is created when someone selects a list of recipients and sends them a message. Membership into the group is confirmed by a response message to the sender in a timely manner; e.g., 5 minutes. The speed in which the acceptance/reply message is sent defines the time decay parameter (e.g., 100× the response delay=max 500 minutes for a response delay of 5 minutes). The geographical separation between the sender and each confirmed recipient is calculated (e.g., group is circumscribed by a sphere of 100 meter radius) and defines the locus of the group; e.g., within 200 meters. Alternatively, the group creator may statically select the time decay factor and the locus radius.

In an alternative embodiment, a group is created when two or more willing participants come within certain range and their proximity is automatically detected by the system. Willing participants are those that state in their intention to connect with like-minded individuals. This embodiment may be implemented as beacons being broadcast with characteristics that define like mindedness. For example, the embodiment may leverage Twitter's #hashtags. In this instance, the beacon would broadcast the user's interests as a series of #hashtags (#CarolinaPanthers, #MiamiDolphins, etc). Upon detecting intersecting interests the stations create a group in similar fashion as before (invite/accept/confirm handshakes). Thereafter the group or swarm behaves substantially identically.

Individual membership in the group is maintained as long as the location of the individual is within range of the center of the group (calculated as the center of gravity for the group) as long as there is continued interaction within the time decay parameter. These two parameters are combined to provide a membership probability score. That is, the membership probability score is a factor of distance from the center of gravity for the group and communication within the time decay parameter. The closer the individual is to the center of the group and the more interactive the more likely the membership probability score. To maintain membership while away from the group the individual must be more participatory, conversely less participation is needed to maintain membership while inside the locus.

Once the group is established, the sender of the message will additionally send as part of the message the time, location, velocity and motion vector the group as well as the calculated current locus of the group. Armed with this information, each recipient can calculate if their current location is within the locus as well as the elapsed time since the last interaction. If the recipient is calculated to still be a part of the group, the message will be displayed to the user and the group details will be updated (location, locus, current members). If the recipient is calculated to be outside the group, the message will be suppressed and a response sent to the entire current group membership that the recipient is outside the group. The time decay counter is reset in all group members to the message sent time.

Upon expiration of the time decay counter, the group is naturally disbanded and the distribution list deleted from each participating device.

Enlargement of the group is done by any member of the group through the sending of a message and the confirmed response, which then generates a broadcast "welcome" message to all participants to amend the distribution list as well as the group details.

Based on the foregoing, it will be understood that the present invention provides several unique benefits not available in the conventional communication systems. For example, the present invention utilizes swarming techniques; i.e., combining in the temporal and geographical domains, to establish, maintain, and disband message distribution lists in location-aware portable devices. Also, the present invention provides the ability to form messaging groups or swarms implicitly based on like interests and user disposition to connect.

The present invention further provides the ability to incorporate machine systems into human groups; i.e., forming groups of mixed computer intelligence and human intelligence, to thereby form groups of integrated machine and humans that share information, data and experiences.

The present invention is also easy to setup and maintenance of group membership is built-in to the protocol along with time-to-live parameters. Moreover, the invention may utilize cross platforms by leveraging existing SMS/MMS protocols. The inclusion of an agent capable of recording enables replay of group dynamics to model learning opportunities, such as "how do I handle a bully?"

As part of the messaging group there would be a profile. The profile would contain a setting(s) that would enable users to broadcast that they are interested in joining a swarm and participate in the group collaborating. The profile would contain setting information that would allow a use to specify parameters such as proximity to them, or subjects they are interested in collaborating on such as Panthers Game or Daytona 500 Race. The profile may also contain a setting to enable users to receive broadcast requests, or block them. So a person at the Carolina Panthers Game could broadcast that within 0.5 miles with a statement such as "I would like to join a social swarm with the topic of the Carolina Panthers."

The message types may include group invitation messages, user messages, acceptance messages, confirmation messages, group replay messages, and group profile messages. Invitation messages establish the group. Explicit group membership change messages are a sub-type of this message. User messages are the message type that is most often used, when users communicate amongst themselves. Acceptance messages are the message that the receiving station sends back to the sender to confirm receipt of group invitation or regular user messages. A confirmation message is the message that the sender sends back to all the confirmed recipients of regular user or group invitation messages and it contains the updated group profile for local storage by each recipient. Group replay messages are messages sent after groups are formed. Scenarios that have already happened can be replayed. Robots are significant to the contextual time travel aspects provided by group replay messages. Group profile messages as present as part of group creation activities, whereby the details of a particular group are calculated into a profile. The profile information is distributed amongst all participants so that no one participant alone can cause the group dissolution.

The profile (anchored by an arbitrary uniqueness identifier) contains the identifier and a version number, the locus (center and radius describe the circular locus) and time decay parameters for the group, as well as a membership list. For each member, the system stores the last known location (taken from the time of last interaction) and timestamp. The profile is updated every time there's a message sent to the entire membership.

In some embodiments, the profile may be a "traveling" profile which will add a speed and vector component to the profile to be used in locus intersection calculations to account for drift during transmission delays. In embodiments where implicit formation is allowed, the group profile is augmented to contain the parameter that created the group such as unique group characteristics; e.g., religious affiliations, sport affiliations, social media characteristics.

Some embodiments may use an implicit joining scheme such as an individual profile. The individual profile anchors the process by being able to associate the several individuals having intersecting parameters (e.g., interest, location) as belonging to a group. In this embodiment the individual profile contains the topics the user is interested in collaborating with as well as the proximity threshold.

FIG. 1 illustrates a flow chart of steps to explicitly create a group in accordance with an embodiment of the present invention. The group may be created by a number of techniques including remote communication between potential group members. The group is created with a series of invite/accept/confirm handshake messages. With reference to FIG. 1, the communication system (described in detail below) allows users to explicitly create groups or swarms selecting recipients and sending a message at step 110 to establish a group 10. Step 110 is a sender action. The invitation message 20 shown at step 120 includes a list of participants/recipients and the sender location. At step 130, each recipient 30 may approve or accept the invitation and the communication system then at step 140 sends an acceptance message 40 to all members 35 of the group 10. Next, the system will send a list of acceptances or members of the group 10 at step 150. At step 160, the system will determine whether there are a suitable number of members for group formation and, if so, the system will then calculate the locus, range and time decay parameters for the group 10 at step 170. At step 180, the system will send a confirmation message 50 including the locus, range and time decay parameters calculated in step 170. Lastly, each member 35 of the group 10 will receive the confirmation message 50 which will be displayed on their computing device; e.g., phone, PDA, laptop, etc., for viewing details about the group 10 and each participant/member 35 (step 190).

FIG. 2 illustrates a flow chart of steps to implicitly create a group in accordance with an embodiment of the present invention. The group may be created with a series of invite/accept/confirm handshake messages, after having an established intersection of interests and locations. With reference to FIG. 2, the system will operate a standby loop 210 of sent and received messages which may take the form of a broadcast beacon. If the system receives a broadcast beacon 210 from a potential member 60 at step 220, the system processes the interests or profile for the potential member 60 at step 230 and determines whether there are common interests or features among different potential members 60 at step 240. If there are common interests, then the system processes the location of the potential members 60 at step 250. If the potential members 60 are within a predetermined locus or radii as determines at step 260, then the system initiates at step 270 the explicitly group creation methodology set form with respect to FIG. 1 and described above.

If, on the other hand, the system does not receive any broadcast beacon at step 220, the system will continuously monitor for explicit invitations at step 280 and for acceptance of the invitation at step 285 which is equivalent to the acceptance message 40 of step 140 described with respect to FIG. 1. Once accepted at step 290, the system will initiate at step 270 the group creation method described above with respect to FIG. 1.

Explicit group membership changes are also provided by the present invention. To add members 35 to the group 10, any member 35 may trigger a group creation process with a new potential participant 60, which upon acceptance 40 will trigger a recalculation of the group profile and transmission of group profile to the all the participants advising of membership change as well a confirmation message 50 to the new participant or new group member 35.

In the preferred embodiment, removal of member(s) 35 from the group 10 can only be done by the specific group member who wishes to be removed. To do so the participant sends a departure message to all the participants advising of membership change so the system may update the copy of the group profile in its local storage.

Implicit group membership changes are also provided by the invention. Group membership calculations happen every time there's a message sent to the group. Upon receipt of a message, the receiving station will calculate its distance from the sender and based on that determine if the two stations' locus intersect. In some embodiments, the sender may additionally send a speed/direction metric that the receiving station will use to estimate the locus of the sender at receipt time versus send time. If there is intersection between the two locii the message, the message is received as a "strong" message and is passed to the user and a receipt acceptance sent to the sender. The message may contain the receiver's current location, and optionally speed/vector. The sender will then re-compute the profile details from all the received acceptances, update the version number and send a confirmation message. Thus membership is implicitly confirmed by location.

If the receiving station determines there is no intersection between the sender's and receiver's locii, the message is received as a "faint" message and passed to the user with an alert indicating the message is faint or out of range. The user is given the opportunity to confirm receipt of message, whereupon the receipt acceptance message is passed back to the sender and membership is implicitly confirmed by interaction/time-decay.

The present invention also provides for implicit group disbanding or expiration. From each received profile update, each signal station may compute an expiration time (current time+decay factor). Any message received after the expiration time is by default received as a "faint" message. In this manner, only active responders or member 35 will remain in the group, if any. Any message received significantly after the expiration time (2× decay factor) are not passed to the user as "faint" messages, but instead are not confirmed back to the sender. In this manner, the group can only survive by each receiver actively sending a regular user message. There is no explicit method for disbanding the group. Each member may explicitly rescind their membership instead.

Figure 3B:
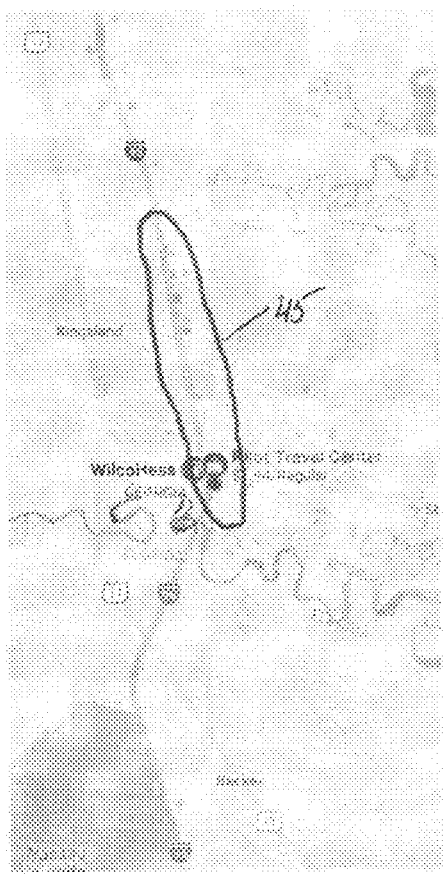

FIGS. 3a and 3b illustrate two different geographical representations of group 10 and the group's spatial relation to one another in accordance with an embodiment of the present invention. With reference to FIG. 3a, the group 10 is located south of the Georgia-Florida line and comprises five (5) members 35, which will referred to as members 35a, 35b, 35c, 35d, 35e. The group 35 will have a center 'c' and a radius 'r' as calculated by the system depending on the position and movement of the members 35a-35e. The radius is calculated by determining the location of each member 35a-35e and determining the locus central to all members according to standard mathematical calculations. The radius is likewise calculated based on the location of each member and the further members from the center determines the radius for all members with the radius being slightly larger than the specific distance from the center to the farther member from center to encompass all members. It is noted that the radius may be a predetermined distance selected by a primary sender of the invitation who chooses to limit participation in the group to predetermined area.

It is further noted that the group 10 may be defined by a speed and direction vector determined by one or more of the members 35. For example, the speed and direction vector may be calculated based on motion of a single member of the group 10 or it may be an average of all members of the group 35. With a speed and direction vector, the system may be able to predict future locations of the group and estimate arrival times etc. As will be described below with reference to FIG. 4, the member's strength to the group is inversely proportional to the distance of the member from the center 'c' and the time for each member to respond to a specific message. The closer a member is to the center 'c' the less communication is required to maintain membership and/or the less time to respond to a specific message is required to maintain membership.

FIG. 3b illustrates the positioning of the members 35a-35e of group 10 after a passage of time from the time illustrated in FIG. 3a. As shown in FIG. 3b, the members 35a-35c have disbursed to some degree with member 35a being farther away from member 35e. In this case, the center 'c' and radius 'r' have been recalculated based on the new positions of each member. The recalculation is dependent on each member remaining in contact with the group 10. Individual membership in the group is maintained as long as the location of the individual is within range of the center of the group, which is calculated as the center of gravity for the group, and as long as there is continued contact with the group. Each member remains in the group as long as there is continued interaction within the time decay parameter. These two parameters; i.e., remaining within the locus of the group and continuous contact, are combined to provide a membership probability score. That is, the membership probability score is a factor of distance from the center of gravity for the group and communication within the time decay parameter. The closer the individual is to the center of the group and the more interactive the member is with respect to communication, the more likely or higher the membership probability score. To maintain membership while away from the group the individual must be more participatory. Conversely, less participation is needed to maintain membership while inside the locus.

The following table represents an example of the membership probability score (PS) as reflected by the present invention, whereby one embodiment of the resent invention utilizes an inversely proportional equation to calculate the probability score; PS=1/t+1/d where 't' is time to respond to a message and 'd' is distance from the center of gravity of the group.

| Member | Distance From Center (miles) | Average Time to Respond (min) | PS |
|---|---|---|---|
| A | .75 mi | 4.25 min | 1.57 |
| B | .25 mi | 4.25 min | 4.24 |
| C | 1.25 mi | 2.5 min | 1.2 |
| D | .75 mi | 2.5 min | 1.73 |
| E | .25 mi | 1 min | 5 |

Of course, this equation to calculate probability score is only provided by way of example and the magnitude and/or dimension of each factor may be varied depending on the circumstances and scenario provided by the specific group being formed. For example, while distance is provided in miles in the example above, some scenarios may require dimension in meters while monitoring a group within a mall or amusement park, while other scenarios may require dimensions in miles when following a group in a state park or a traveling caravan.

As evident from FIG. 3b, the center of gravity of the group 10 is necessarily at the center of the radius of the group. Instead, the center of gravity will be dependent on the centration of each member. With reference to FIG. 3b, the members 35a, 35b, 35c, and 35d are concentrated toward the top of the circle circumscribing the group 10; thus, the center of gravity ('c') for the group 10 is distal from the member 35e. In this case, the distance of member 35e from the center 'c' will require the member 35e to communicate more often with the group to retain member 35e's membership within the group 10.

The center of gravity, which is also referred to as the "location center," may be calculated using known technics, for example, the equation may be represented as follows assuming a two-dimensional area of coverage:

$$X=(x_1+x_2+x_3+x_4+x_n)/n \text{ and } Y=(y_1+y_2+y_3+y_4+y_n)/n.$$

Figure 4:
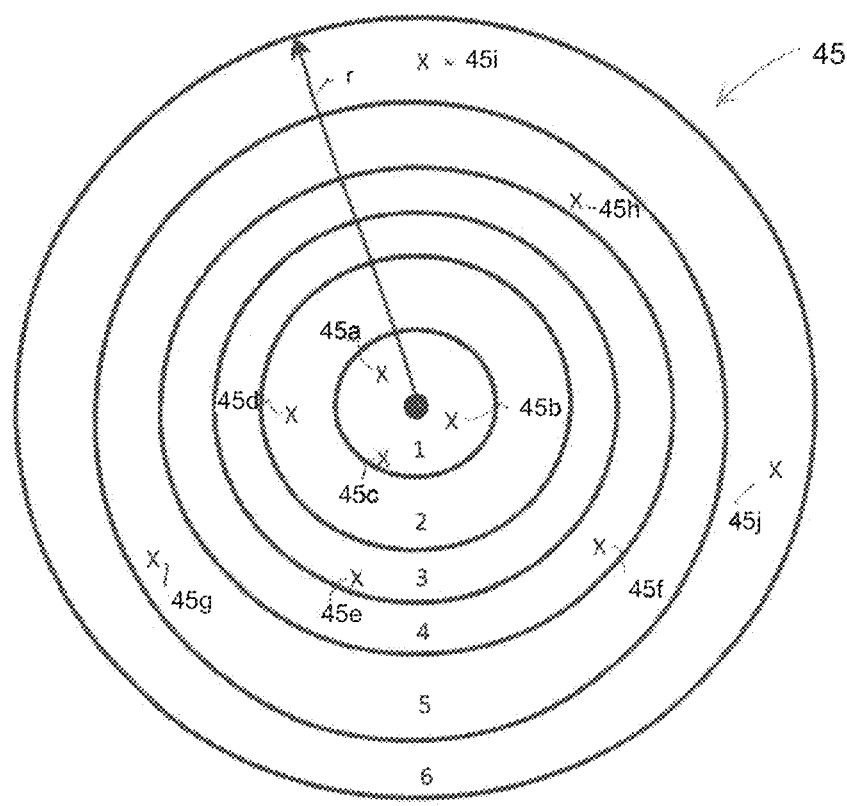
FIG. 4 illustrates a schematic representation of a collaborative group distributed about an area of interest in accordance with an embodiment of the present invention.

Therefore, the system will be able to locate the members of the group using GPS or other suitable position locating services and the coordinates will provide sufficient data for the system to calculate the center of gravity for the group. Further, it is possible to "weight" or value different members of the group with different values to alter the foregoing formula and provide certain members with more importance for locating the center of the group for purposes of this invention. In other words, the creator of the group may be permitted to carry more influence over the location FIG. 4 illustrates a schematic representation of a group 10 distributed about an area of interest in accordance with an embodiment of the present invention. With reference to FIG. 4, it is noted that each member 45a, 45b, 45c, 45d, 45e, 45f, 45g, 45h, 45i and 45j. For FIG. 4, the center of gravity c is determine by averaging the location of each member 45a-45j and calculating the center of gravity 'c'. AS with the example provide above with respect to the probability score, here the probability score (PS) is calculated by the distance of each member from center 'c' and factoring in each member's response to time to message sent to the members of the group 45. Here, each member is classified into a zone or ring 1-6 and the zone of location is compared to response time for each member to determine the probability score for each member 45a-45j. Here, the probability score (PS) may be calculated as 1/z+1/t where zone is the zone and t is the time to respond to a message sent to the members of the group. If member 45h (who is in zone 5) respond to a message in 25 minutes, then member 45h may have a probability score of 0.24, while member 45f (who is in zone 4) will have a probability score of 0.29 with the same response time of 25 minutes. Member 45f will have a higher probability score as compared to member 45h given the fact the response time is the same but the distance from center 'c' is different.

Each member will be assigned a probability score based on the average of all probabilities score the respective member has accrued while participating in a group. In one embodiment, a member's participation in the group is based on the probability score being within a predetermined margin. Once the member falls outside the predetermine margin, the group is notified that the member is being released from the group. In this instance, the member is given an opportunity to reestablish connection with the group prior to being released. Absent a request to maintain membership in the group, the non-responsive member will be released from the group.

In another embodiment, individual membership in a group is maintained as long as the location of the member is within the range defined by the center 'c' of the group and the radius 'r' and as long as there is continued communication of the member within the predetermined time decay.

Time decay is a predetermine number, for example, 10× (time to respond to origination invitation to join). Membership, in this embodiment, may be terminated if a member is outside the radius and the member fails to respond within the time decay parameter. In other words, if a specific member takes 4 minutes to respond to the initial invitation join the group, the member's time decay will be 40 minutes. If that same member is outside the radius 'r' of the group and the same member takes longer than 40 minutes to respond to a specific message, then the member's participation in the group may be terminated. Typically, a warning message or alert will be sent to the member and the group prior to termination.

An ad-hoc groups or swarms are local area networks that connect multiple devices without relying on a base station to coordinate flow of messages in the network. Nodes cooperate each other for forwarding the network packets. According to an embodiment of the present invention, a mobile node receives a request from other nodes and accepts the request by respective acceptance process. In one of embodiment, the acceptance process is to satisfy a criteria required by a user or sender. The criteria for the acceptance process may include matching one or more user defined parameters, hobbies, or interests.

According to alternate embodiment, a mobile node receives profiles of one or more users by wireless network. In one of embodiment, the profile includes users preferences and criteria that the mobile node is looking in other mobile nodes to be met completely or partially. The mobile node computes similarity of its own profile with the received one or more profiles. The mobile node provides indication by replying the received request when similarity of the profiles is greater than the predefined threshold. In one of embodiment, the threshold is configured by a user as user preference. In one of embodiment, the threshold is configured by algorithm and is updated based on historical trends of as how threshold is helping users to find similar users. The algorithm lowers threshold if number of similar users are less and increases threshold if many similar users are suggested.

In one of embodiment, similarity of the profiles is calculated using cosine similarity.

Figure 5A:
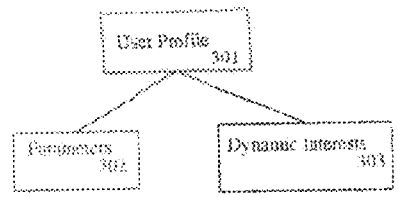
FIG. 5a illustrates a schematic relation of the user profile in relation to the group parameters and dynamic interests according to an embodiment of the present invention.
Figure 5B:
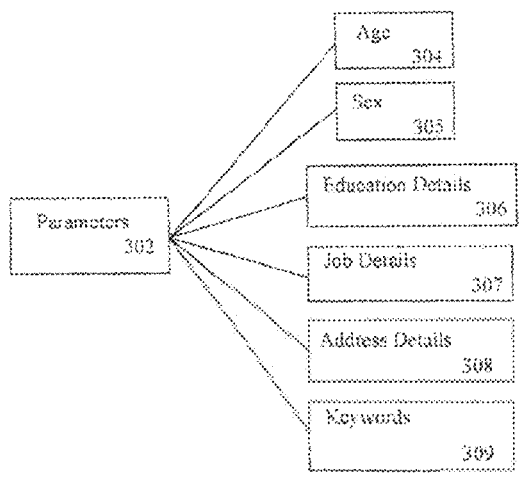
FIG. 5b illustrates a relationship of the different type of parameters used to compile the user profile according to an embodiment of the present invention.
Figure 5C:
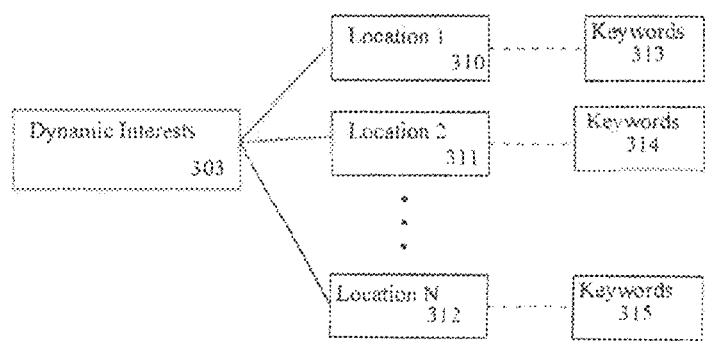
FIG. 5c provides structure of dynamic interests according to an embodiment of the present invention.

According to present invention, FIGS. 5a-5c provides a description of user profile that is used to create ad-hoc social network in one of embodiment. FIG. 5a illustrates a schematic relation of the user profile in relation to the group parameters and dynamic interests according to an embodiment of the present invention. A user profile 301 includes chosen parameters 302 and dynamic interests 303. FIG. 5b illustrates a relationship of the different type of parameters used to compile the user profile according to an embodiment of the present invention. Parameters 302 further includes but not limited to age 304, sex 305, education details 306, job details 307, address details 308, hobbies, interests, and other keywords 309.

In one of embodiment, the dynamic interests are provided by user of the mobile device or can be automatically extracted based on user behavior. In one of embodiment, user behavior includes search and browsing history. Dynamic interests are extracted from keywords used in the search and from accessed URLs of the links visited by the user.

FIG. 5c provides structure of dynamic interests 303 according to an embodiment of the present invention. The dynamic interests are based on different locations. In one of the embodiment, location based interests are based on location based user behavior including location based search and browsing history. Keywords 313 are extracted and stored based on user behavior at Location 310. Similarly, keywords 314 are extracted based on user search and behavior at location 311 and keywords 315 are extracted based on user search and behavior at location 312.

In one of embodiment, the Keywords are time accumulated meaning whenever a user visits a location, the system activates the profile if already exists for that location or creates a new profile for that location if it is a new location. User profile of the location is updated based on user search and behavior for that location.

In one of the embodiment, the user has a global profile that is combination of all local profiles and is independent of location. Global profile is updated continuously based on user behavior at any location.

Figure 6:
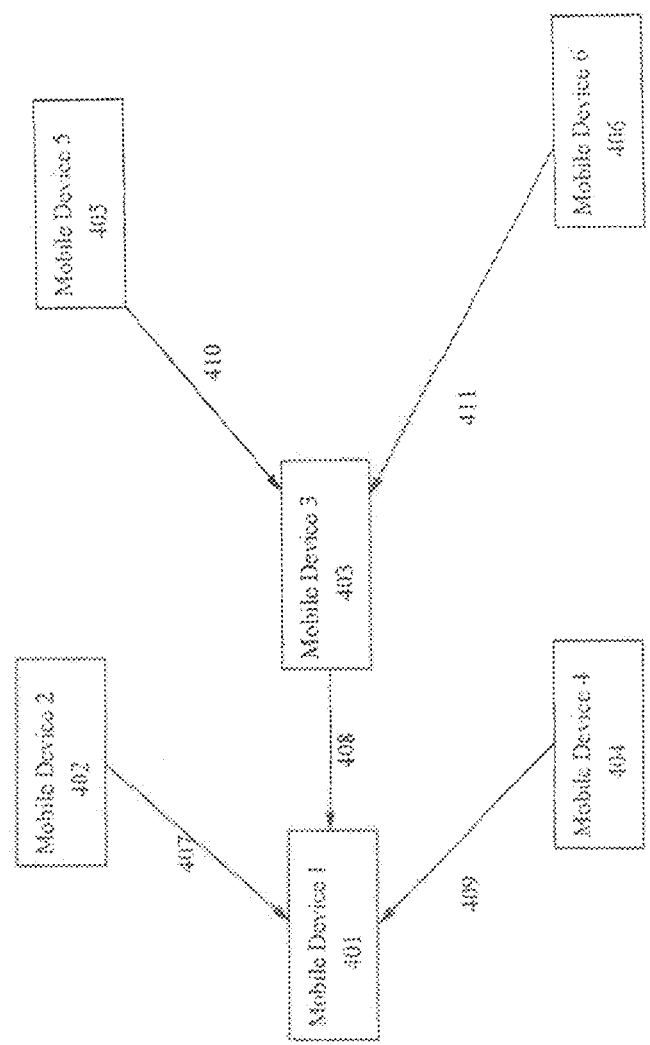
FIG. 6 describes communication system and network that is used in the present invention to create a social network using ad-hoc communication network.

FIG. 6 describes communication system and network that is used in the present invention to create a social network using ad-hoc communication network. Ad-hoc communication network is a network in which nodes cooperate to forward network packets without any base station.

As an example to demonstrate, FIG. 6 includes a network 400 with exemplary mobile devices 401-406 that are part of the wireless network. In one of the embodiment, the ad-hoc social network is created by a request from one mobile device to another and consequent reply or acknowledgement from the other device based on the received request.

In one of embodiment, ad-hoc social network is established in two phases. Phase 1 is a preprocessing phase in which all nodes interested in the establishing ad-hoc social network broadcast their request, indication, or their profile. For example, as displayed in FIG. 6, mobile device 401 receives profile and other information from all nodes that can be connected with mobile device using ad-hoc network. Mobile device 401 receives user profiles from mobile devices 402-404 directly via paths 407-409 and from mobile devices 405-406 indirectly via mobile device 403 and via paths 410-411. Mobile device 403 further forwards profiles received from mobile devices 405 and 406 to mobile device 401 via path 408.

Once a mobile device receives a request from another mobile device, it decides if reply or acknowledgement should be sent to the other mobile device sending the request. In one of embodiment, the decision to send reply is made by an acceptance process based on similarity value and threshold required by the mobile device.

In one of embodiment, mobile device 401 computes similarity with the profiles received from other mobile devices before accepting the social connection request.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention is described in one or more embodiments as being related to selectively sending notifications to a computer, tablet, smart watch or a mobile phone, the invention described herein is also applicable to selectively sending notifications to a tablet computer, a desktop computer, a mobile phone, a smart watch, or some other type of electronic device capable of receiving a notification. For example, the present invention may send a notification to a desktop computer if the user's tablet computer is in use, or vice versa. In a preferred embodiment the notification is sent to a different type of device than that the type of device that the notification as originally intended. For example, if the notification was originally directed to a laptop computer, then in accordance with one or more embodiments of the present invention that notification will be sent instead to a desktop computer, a smart watch, a mobile phone, etc., such that each of these alternative recipients of the notification are of a different type of device than the original desktop computer.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
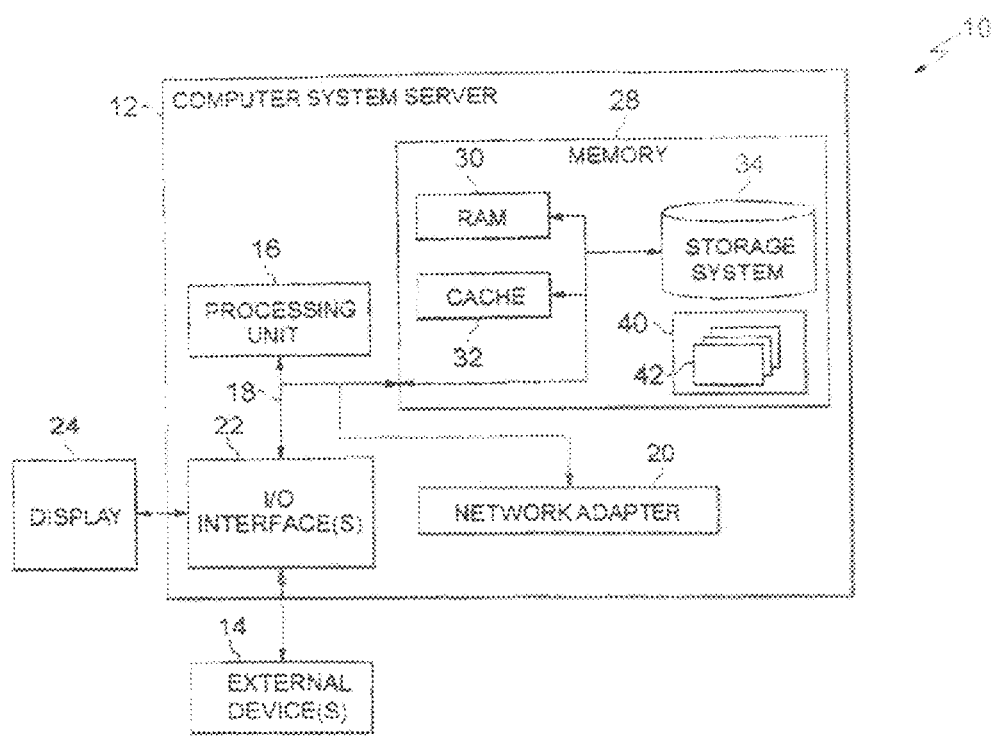
FIG. 7 depicts a cloud computing node according to an embodiment of the present invention.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
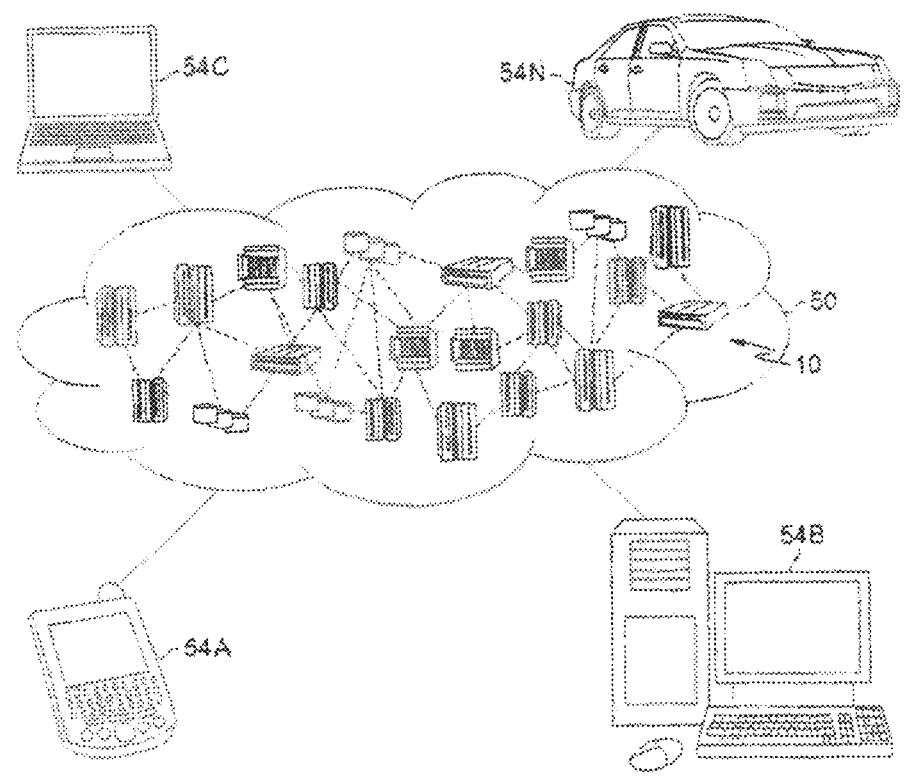
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 4 are intended to be illustrative only and that computing nodes 10 and cloud computing environment 50 can communicate with any type of computerized device over any type of network and/or network addressable connection (e.g., using a web browser).

Figure 9:
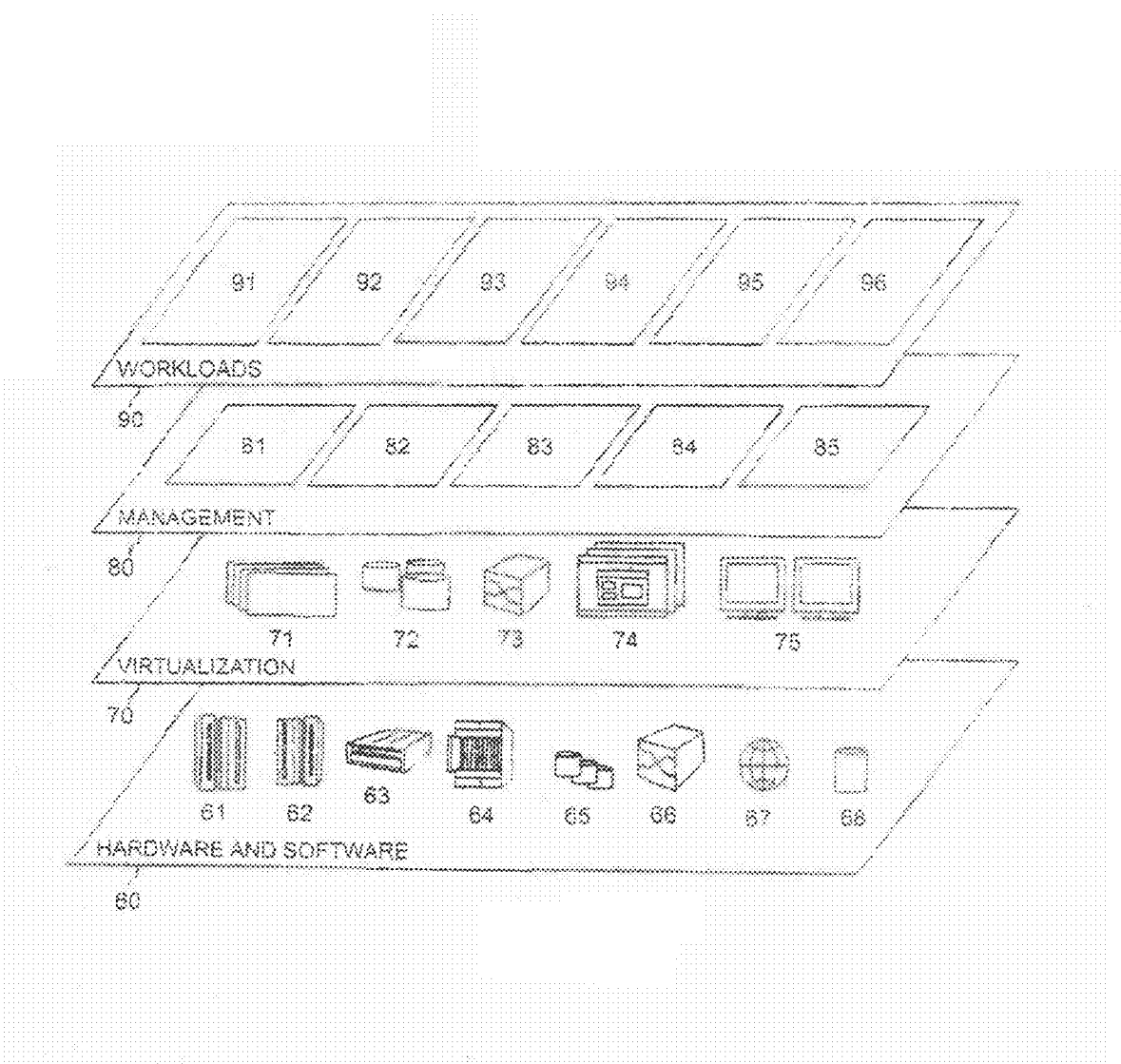
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillments 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification selection and transmission processing 96 for selectively sending notifications to mobile devices as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A computer-implemented method for forming groups using swarming behavior, the computer-implemented process comprising:
    forming, by a computer, a group using a series of invitation, acceptance and confirmation handshake messages;
    calculating, by the computer, a location center for said group, said location center being an average location for members of said group as calculated by the computer from data embedded in at least one message of said series of invitation, acceptance and confirmation handshake messages;
    calculating, by the computer, a perimeter for said group, said perimeter circumscribing said members of said group as calculated by the computer from said data embedded in at least one message of said series of invitation, acceptance and confirmation handshake messages;
    calculating, by the computer, a time decay parameter for said group, said time decay parameter being a length of a message response time to maintain membership in said group as calculated by the computer from said data embedded in at least one message of said series of invitation, acceptance and confirmation handshake messages;
    calculating, by the computer, a group profile for said group, wherein said group profile comprises at least said location center, said perimeter and said time decay parameter; and
    adding a new member to the group, by any member triggering an invitation that invites said new member to join said group, wherein an acceptance of said invitation is received by said new member;
    recalculating, by the computer, said group profile upon receipt of said acceptance by said new member, said recalculating based on new data included in said acceptance; and
    transmitting, by the computer, said recalculated group profile to all members including a confirmation message to the new member.

2. The method according to claim 1, further comprising:
    performing said calculating of said location center based on a weighted scale where each different member is assigned a different weight which is multiplied by each location of said each different member.

3. The method according to claim 1, further comprising:
    performing said calculating of said location center includes a calculation of a motion vector indicating a speed and direction of said location center over time.

4. The method according to claim 1, further comprising:
    in response to receipt of said acceptance message, a receiving station calculates a respective distance from a sender and determines whether a first locus of the receiving station and a second locus of the sender is within a predetermined distance.

5. The method according to claim 4, further comprising:
    in response to a determination the first locus and the second locus are within said predetermined distance, the acceptance message is confirmed as a strong message, said acceptance message is passed to a user and a response message sent to the sender containing a current location of the receiver.

6. The method according to claim 5, further comprising:
    computing said group profile based at least in part on details from all acceptance messages,
    updating a version number for said group, and
    sending an updated confirmation message.

7. The method according to claim 4, further comprising:
    in response to a determination said locus is not within a predetermined distance, the acceptance message is confirmed as a faint message, said acceptance message is passed to a user with an alert indicating the message is faint wherein the user confirms receipt of message, and a response message is passed back to the sender.

8. The method according to claim 7, further comprising:
    updating said group profile;
    in response to receiving a group profile update, each station computing an expiration time defined as a current time plus said time decay parameter, wherein the message received after the expiration time is by default received as said faint message and the message received a predetermined time after the expiration time is not confirmed back to the sender.

9. The method according to claim 8, further comprising:
    in response to a determination the receiving station does not respond within the expiration time, removing the receiving station from the group.

10. A computer program product comprising:
a computer-readable storage device; and
a computer-readable program code stored in the computer-readable storage device, the computer readable program code containing instructions executable by a processor of a computer system to implement a method for forming groups, the method comprising:
forming a group using a series of invitation, acceptance and confirmation messages;
calculating a location center for said group, said location center being an average location for members of said group as calculated by the computer from data included in at least one message of said messages;
calculating a perimeter for said group, said perimeter circumscribing said members of said group as calculated by the computer from said data included in at least one of said messages;
calculating a time decay parameter for said group, said time decay parameter being a length of a message response time to maintain membership in said group as calculated by the computer from said data included in at least one of said messages;
calculating a group profile for said group, wherein said group profile comprises at least said location center, said perimeter and said time decay parameter; and
adding a new member to the group, by any member triggering an invitation that invites said new member to join said group;
receipt of an acceptance of said invitation by said new member;
recalculating said group profile upon receipt of said acceptance by said new member; and
transmitting said recalculated group profile to all members including a confirmation message to the new member.

11. The computer program product according to claim 10, further comprising:
performing said calculating of said location center, said perimeter and said time decay parameter being based on data associated with a single message of said series of invitation, acceptance and confirmation handshake messages.

12. The computer program product according to claim 10, further comprising:
in response to receipt of said acceptance message, a receiving station calculates a respective distance from a sender and determines whether a first locus of the receiving station and a second locus of the sender is within a predetermined distance.

13. The computer program product according to claim 12, further comprising:
in response to a determination the first locus and the second locus are within said predetermined distance, the acceptance message is confirmed as a strong message, said acceptance message is passed to a user and a response message sent to the sender containing a current location of the receiver.

14. The computer program product according to claim 13, further comprising:
computing said group profile based at least in part on details from all acceptance messages,
updating a version number for said group, and
sending an updated confirmation message.

15. The computer program product according to claim 12, further comprising:
in response to a determination said locus is not within a predetermined distance, the acceptance message is confirmed as a faint message, said acceptance message is passed to a user with an alert indicating the message is faint wherein the user confirms receipt of message, and a response message is passed back to the sender.

16. The computer program product according to claim 15, further comprising:
updating said group profile;
in response to receiving a group profile update, each station computing an expiration time defined as a current time plus said time decay parameter, wherein the message received after the expiration time is by default received as said faint message and the message received a predetermined time after the expiration time is not confirmed back to the sender.

17. A computer system, comprising:
a processor;
a memory coupled to said processor; and
a computer readable storage device coupled to the processor, the storage device containing instructions executable by the processor via the memory to implement a method for forming groups using swarming behavior, the method comprising the steps of:
forming a group using a series of invitation, acceptance and confirmation messages;
calculating a location center for said group, said location center being an average location for members of said group as calculated by the computer from data included in at least one message of said messages;
calculating a radius for said group, said radius defining a perimeter circumscribing said members of said group as calculated by the computer from said data included in at least one of said messages;
calculating a time decay parameter for said group, said time decay parameter being a length of a message response time to maintain membership in said group as calculated by the computer from said data included in at least one of said messages;
calculating a group profile for said group, wherein said group profile comprises at least said location center, said radius and said time decay parameter; and
adding a new member to the group, by any member triggering an invitation that invites said new member to join said group;
receipt of an acceptance of said invitation by said new member;
recalculating said group profile upon receipt of said acceptance by said new member; and
transmitting said recalculated group profile to all members including a confirmation message to the new member.

18. The computer system according to claim 17, further comprising:
performing said calculating of said location center, said radius and said time decay parameter being based on data associated with a single message of said series of invitation, acceptance and confirmation handshake messages.

19. The computer system according to claim 17, further comprising:
in response to receipt of said acceptance message, a receiving station calculates a respective distance from a sender and determines whether a first locus of the receiving station and a second locus of the sender is within a predetermined distance.

20. The computer system according to claim 19, further comprising:

in response to a determination the first locus and the second locus are within said predetermined distance, the acceptance message is confirmed as a strong message, said acceptance message is passed to a user and a response message sent to the sender containing a current location of the receiver.

* * * * *